Patented July 22, 1924.

1,502,311

UNITED STATES PATENT OFFICE.

WILLIAM H. MASON, OF LAUREL, MISSISSIPPI.

PROCESS OF TREATING LUMBER.

No Drawing.    Application filed December 17, 1920.    Serial No. 431,474.

*To all whom it may concern:*

Be it known that I, WILLIAM H. MASON, a citizen of the United States, and a resident of Laurel, county of Jones, and State of Mississippi, have invented certain new and useful Improvements in Processes of Treating Lumber, of which the following is a specification.

My invention relates to a process for treating resinous sawn lumber to improve its quality, reduce its weight, and to produce valuable by-products therefrom. The invention is applicable to soft woods containing sufficient resinous material to warrant reclamation. It will here be described, for purposes of illustration and for affording an understanding of the invention, as applied to yellow pine lumber, but without limitation thereto.

Lumber having a comparatively high proportion of resinous content is preferably selected for treatment by the present process. This may conveniently be done by having a grader place suitable marks on same as it passes him on the sorting chain of the saw-mill and by causing the lumber so marked to be taken off the chain at a suitable station, to be subjected to the process of the present invention.

The lumber is first treated as by means of hot water or steam or both, to soften it and open up its pores and resin ducts and to extract resinous material which is collected and saved. It is then subjected to mechanical pressure while hot, preferably by being passed through rolls under heavy pressure, whereby substantial quantities of resinous material are extracted which are also collected and saved. It is then preferably treated with hot water or steam or both, whereby further resinous material is removed from the lumber and collected and saved, and the compressed lumber is permitted to expand, resuming substantially its original thickness. The lumber is finally dried in the usual manner, either by kiln drying or by drying in the open air.

Lumber treated in accordance with the present invention not only yields considerable quantities of valuable resinous material but is substantially improved in quality and made of substantially greater value by removal of resinous material, the treated lumber being graded up one or even two grades as a result of the removal of resins. The very considerable reduction in weight of the lumber is of importance, particularly when shipped for long distances at high freight rates.

The softening of the lumber preparatory to the pressure treatment in the rolls, is preferably accomplished by subjecting the lumber to a hot water or steam bath. In the case of using a hot water bath same is preferably contained in a tank having a low place in the bottom for collection of resinous material sinking to the bottom. Rosin becomes liquid at about 70° C. and with water at or about this temperature the resin ducts are opened up and considerable quantities of resinous material flows out of the lumber.

These tanks are preferably provided with an air-tight domed cover, and the water heated as by means of steam, and after the air is driven off, the vapors, which up to the time the air has been driven off are not condensable by an ordinary water cooled condenser, become condensable and are condensed and saved, the domed cover being provided with a suitable vapor pipe leading to a condenser. The condensate consists of water formed from condensed steam and a mixture of turpentine and pine oils, which settle to the top of the condensed water and are readily separated therefrom. An air vent is left at the exit end of the condenser for the passage of air and the uncondensable vapors which appear during the early stages of the treatment. The admission of steam is regulated to secure slight superatmospheric pressure within the tank while condensation of the issuing vapors is going on, and to insure that such superatmospheric pressure is obtained in order to prevent access of air and the production of uncondensable vapors, steam is supplied in sufficient quantities so that either steam or condensed drippings are kept issuing from a small tube connected to the tank down close to the water level.

Owing to the presence of the water bath the temperature in the tank cannot rise substantially above the boiling point of water, although the steam before its admission to the tank may be at a higher temperature.

The preferable mode of applying the steam is by admitting same beneath the surface of the water which is thus kept boiling during the softening treatment. The agitation obtained in this or other ways is of assistance in removing resinous material from the lumber.

Several of these softening tanks are preferably provided so that while some are being filled or emptied others may be in use for the hot water or steam softening treatment.

The resinous material extracted from the lumber by the hot water or steam or both at first generally floats on the surface of the water, but as the lighter resinous materials are distilled therefrom and carried over with the steam the heavier residue of the resinous material sinks to the bottom of the tank whence it may be withdrawn from time to time and saved.

After the wood is sufficiently well softened and the resin ducts opened up, it is subjected to mechanical pressure while hot. This may be done in various ways, but I prefer to apply pressure by passing the lumber through between pressure rolls while the boards are confined or supported at their edges to keep them from spreading, since unless this be done cracking of the lumber may result. The rolls are preferably of relatively large diameter, say about 30 inches in diameter, to prevent injury to the fiber of the lumber which may result from the sudden application of pressure for a short distance along the length of the board by means of rolls of unduly small diameter. Progressive application of mechanical pressure as by means of passing the hot softened lumber through pressure rolls affords ample opportunity for escape of resinous material from the ducts and pores of that portion of the lumber which is pressed between the rolls and this localized extraction effect progresses gradually from one end of a board to the other as the board is passed between the pressure rolls.

One set of rolls is usually sufficient but I may pass the lumber through a plurality of rolls and may also subject it to further softening treatment between roll passages through the pressure rolls. The rolls are preferably heated as by means of steam and the lumber and rolls during the pressing operation are preferably kept at a temperature of from about 70° C. to about 90° C. Below 70° C. the resinous material is not sufficiently fluid to flow readily out of the minute ducts in that portion of the wood under pressure without injury to the wood from the pressure applied, and above about 90° C. substantial losses of the lighter resinous materials may occur.

In order to prevent injury to the lumber at knots or other hard spots which cannot be softened so as to become compressible by the preliminary softening treatment, the pressure rolls are preferably so mounted that they can separate or yield somewhat to permit the passage of knots or the like therebetween. For example, the rolls may be held up to their work by a steam cylinder whereby regulable pressure is maintained and whereby the rolls can yield to a sufficient extent to prevent injury to the softened lumber when knots or other hard places are encountered. The pressures used are preferably not sufficiently great to permanently injure the fibre of the lumber.

After passing through the pressing operation, the lumber is preferably placed in a bath of hot water or steam. In the case of a hot water bath, same is preferably kept at a temperature somewhat above 70° C. and additional resinous material is recovered from the lumber by the water, leaving the lumber with its surface washed and in a clean and good surface condition. In this bath the lumber which has been compressed by the rolls expands to substantially its original form and thickness. The tank provided for this treatment may also be provided with a bottom having a low place in it for the collecting of resinous material sinking to the bottom. It is usually sufficient to collect material floating on the top of the water, as by skimming it off and saving it in this manner, but if desired, the soaking tanks can be closed and the resinous material collected by steam distilling from the soaking tanks, as in the case of the softening tanks described above.

The resinous material collected from the softening tanks, from the final soaking tanks, and from the rolls is preferably combined and steam distilled, yielding substantial quantities of turpentine and pine oils as distillates and a residue which is principally rosin, and these materials may be further refined in various known ways.

By combining the yields from the various sources just named with the yield of distillate from the softening tanks, I have secured yields per thousand board feet of "fat" yellow pine lumber, as high as 17 gallons of resinous distillate, made up of about 13½ gallons of turpentine and about 3½ gallons of pine oils, that is to say, about 80% of the former and 20% of the latter, together with about 700 pounds of rosin, and the treated lumber when dried was from 12 to 20% lighter than dried lumber which had not been so treated and was improved in quality to a marked degree, taking one to two grades higher in classification, by reason of its improved condition due to the described treatment.

After being restored to substantially its original thickness in soaking tanks, the drying of the lumber may be completed separately from other lumber, but same is preferably put back on the sorting conveyors and graded, sorted, and dried in the usual manner practiced with green lumber.

In the cooling down which ensues, moisture is expelled outwardly from the heated interior of the lumber and same is substantially free from checks and cracks and is in the very best condition for further drying which may be carried out as in the case of green lumber, either in dry kilns or by drying in the open air. When dried in the dry kilns a substantial reduction of time of treatment and heat required is possible as compared with green lumber because of the readiness with which the moisture can pass to the surface of the treated lumber. Furthermore, in the pressing operation water, as well as resinous materials, is forced out of the lumber, and this appears to result in a substantial reduction of its fixed moisture content, since when finally dried after treatment, it is possible to obtain lower moisture content in the dried lumber than is possible with the same application of heat to "fat" lumber which has not been so treated.

It will be seen that my process, which can be carried out at very low expense, has a number of advantages. Not only does it open up an important new source of supply for the valuable resinous products heretofore obtained principally from trees, now rapidly diminishing in number, or from waste wood which is not available as lumber, but important savings are made by putting the lumber generally in a higher grade, adding to its value and making it available for uses from which it was formerly excluded because of its previous high resinous content, and the shipping weight and, therefore, freight charges are substantially lessened. Thus the invention not merely affords increased conservation of natural resources, but also serves for relieving railroads and other transportation systems of an unnecessary and useless burden, with a consequent saving to the shipper and ultimately to the user of the lumber.

I claim:

1. The process of treating resinous sawn lumber, which consists in subjecting same to the action of water at substantially the boiling temperature, whereby same is softened and the resin ducts opened up, and then passing the hot lumber between pressure rolls while confining it at the edges to prevent spreading and cracking.

2. The process of treating resinous sawn lumber, which consists in soaking it in hot water, then passing the hot lumber between pressure rolls, whereby resinous material is extracted, and then soaking it in hot water for a further period, and drying.

3. The process of treating resinous sawn lumber to yield valuable by-products and to improve its condition and reduce its weight, which consists in soaking the lumber in hot water, subjecting the hot and softened lumber to localized mechanical pressure whereby resinous material is extracted and water is squeezed out, again subjecting the lumber to the action of hot water, whereby it is expanded from the compressed state, drying the lumber, and collecting and saving the resinous material removed from the lumber by the hot water and by the pressure rolls, and refining same.

4. The process of treating resinous lumber, which consists in heating it in a moist bath so as to make the resins fluid enough to flow out through the pores of the wood, subjecting it progressively to localized mechanical pressure sufficient to express resinous material and moisture, but not sufficient to permanently injure the fibre of the wood, subjecting same to heat in a moist bath, whereby the wood is permitted to expand, and collecting and refining the resinous materials extracted from the lumber.

5. The process of treating resinous sawn lumber, which consists in subjecting it to the action of steam in a closed chamber at slightly superatmospheric pressure and at about the temperature of boiling water whereby it is softened, collecting and condensing the vapors going over with the steam, passing the softened wood while hot between pressure rolls and collecting the resinous material expressed by the rolls.

6. The process of treating resinous sawn lumber, which consists in placing same in a water bath in a closed chamber, admitting steam below the surface of the water, whereby the water is boiled at such a rate as to maintain slightly superatmospheric pressure in said chamber, collecting and condensing the vapors produced, collecting the resinous material which sinks to the bottom of the water bath, subjecting the hot wood to localized progressive mechanical pressure whereby resinous material is expressed, and collecting such resinous material.

7. In the process of treating resinous lumber to produce dried lumber with a low moisture content and to obtain valuable resinous material, the steps which consist in subjecting it to heat and moisture, subjecting the hot and softened wood progressively to localized mechanical pressure, whereby resins are expressed and the fixed moisture content is substantially reduced, permitting it to cool, and drying in a dry kiln.

8. In the process of preserving resinous sawn lumber and producing by-products therefrom, the steps which include subjecting the lumber to heat and moisture, passing the hot softened lumber through pressure rolls whereby it is compressed to substantially less than its original thickness, subjecting it to heat and moisture whereby it is permitted to expand to substantially its original thickness, drying the expanded lumber, and collecting and saving the resinous matter separated from the lumber in the various steps of treatment.

In testimony that I claim the foregoing, I have signed my name hereto.

WILLIAM H. MASON.